US008938165B2

(12) United States Patent
Iijima

(10) Patent No.: US 8,938,165 B2
(45) Date of Patent: Jan. 20, 2015

(54) OPTICAL TRANSMISSION DEVICE, OPTICAL TRANSMISSION SYSTEM, OPTICAL TRANSMISSION METHOD AND PROGRAM

(75) Inventor: Noboru Iijima, Tokyo (JP)

(73) Assignee: NEC Corporation, Tokyo (JP)

( * ) Notice: Subject to any disclaimer, the term of this patent is extended or adjusted under 35 U.S.C. 154(b) by 9 days.

(21) Appl. No.: 13/985,600

(22) PCT Filed: Jan. 20, 2012

(86) PCT No.: PCT/JP2012/051729
§ 371 (c)(1),
(2), (4) Date: Aug. 15, 2013

(87) PCT Pub. No.: WO2012/111403
PCT Pub. Date: Aug. 23, 2012

(65) Prior Publication Data
US 2013/0322875 A1 Dec. 5, 2013

(30) Foreign Application Priority Data

Feb. 16, 2011 (JP) .................................. 2011-031003

(51) Int. Cl.
H04B 10/08 (2006.01)
H04B 10/07 (2013.01)
H04B 10/077 (2013.01)

(52) U.S. Cl.
CPC ............ *H04B 10/07* (2013.01); *H04B 10/0775* (2013.01)
USPC .................... 398/33; 398/37; 398/38; 398/15; 398/30; 398/31; 398/177; 398/181; 359/337; 359/341; 359/341.3; 359/334

(58) Field of Classification Search
USPC ............. 398/33, 34, 37, 38, 30, 31, 173, 177, 398/181, 15, 16, 17, 13, 20, 175; 359/337, 359/341, 341.2, 341.3, 334
See application file for complete search history.

(56) References Cited

U.S. PATENT DOCUMENTS

| 6,259,554 | B1 | 7/2001 | Shigematsu et al. | |
|---|---|---|---|---|
| 6,359,708 | B1 * | 3/2002 | Goel et al. | 398/15 |
| 6,504,630 | B1 * | 1/2003 | Czarnocha et al. | 398/15 |
| 2005/0099676 | A1 | 5/2005 | Tokura et al. | |
| 2005/0286898 | A1 | 12/2005 | Okuno | |

FOREIGN PATENT DOCUMENTS

| JP | 2000-332695 A | 11/2000 |
|---|---|---|
| JP | 2003-218796 A | 7/2003 |

(Continued)

*Primary Examiner* — Hanh Phan
(74) *Attorney, Agent, or Firm* — Sughrue Mion, PLLC

(57) ABSTRACT

An optical transmission device according to the present invention comprises: a Raman amplification means; a main signal light sending means which sends first main signal light; a communication interruption detection light monitoring means which sends a first signal if it cannot detect communication interruption detection light; a main signal light monitoring means which sends a second signal if it cannot detect second main signal light; a light monitoring signal analysis means which sends a result of its analysis of a light monitoring signal as a third signal in a predetermined period of time; and a control means which makes the Raman amplification means suspend the generation of the excitation light, if it cannot receive the third signal even after the elapse of the predetermined period of time in the state it has received the first signal and has not received the second signal, and stops sending of the first main signal light from the main signal light sending means when receiving the second signal further.

10 Claims, 7 Drawing Sheets

OPTICAL TRANSMISSION DEVICE 10

(56) References Cited

FOREIGN PATENT DOCUMENTS

| JP | 2004-193640 A | 7/2004 |
| JP | 2004-297790 A | 10/2004 |
| JP | 2006-013676 A | 1/2006 |
| JP | 2008-288849 A | 11/2008 |
| JP | 2010-004410 A | 1/2010 |
| JP | 2010-278493 A | 12/2010 |
| WO | 00/01081 A1 | 1/2000 |

* cited by examiner

… (1) …

OPTICAL TRANSMISSION DEVICE, OPTICAL TRANSMISSION SYSTEM, OPTICAL TRANSMISSION METHOD AND PROGRAM

CROSS REFERENCE TO RELATED APPLICATIONS

This is a National Stage of International Application No. PCT/JP2012/051729, filed Jan. 20, 2012, claiming priority from Japanese Patent Application No. 2011-031003, filed Feb. 16, 2011, the contents of all of which are incorporated herein by reference in their entirety.

TECHNICAL FIELD

The present invention relates to an optical transmission device, an optical transmission system, an optical transmission method and a program which perform APR (Auto Power Reduction) control when a communication interruption occurs.

BACKGROUND ART

In an optical transmission system, there are cases where the power level of laser light used as a main signal is so high that it may exert a harmful effect on a human body. Therefore, in an optical transmission system, performed is so-called APR (Auto Power Reduction) control, which is the control to suspend outputting of a main signal if disconnection of a transmission line or the like occurs, so as not to emit the main signal into the atmosphere or the like.

Technologies related to the APR control are disclosed, for example, in Patent Documents 1 to 5. Patent Documents 1 to 3 disclose a technology of performing the APR control by detecting the presence or absence of a main signal and a light monitoring signal. However, when the technology of the Patent Documents 1 to 3 is applied to an optical transmission system using a Raman amplifier, as a result of ASE (Amplified Spontaneous Emission) of excitation light used for the Raman amplification, there is a possibility of erroneously detecting the excitation light as the main signal. In such a case, the APR control is not performed.

Alternatively, Patent Document 4 discloses a technology of performing the APR control, in an optical transmission device which comprises a Raman amplifier and receives a main signal, by analyzing a bit pattern of a light monitoring signal and thereby detecting an interruption of the main signal. However, in the case of the technology of Patent Document 4, when the light monitoring signal falls into a communication interruption state owing to disconnection of a transmission line or the like, detection of main signal interruption becomes impossible. Also in such a case, the APR control is not performed.

Still alternatively, Patent Document 5 discloses a technology of monitoring a main signal and an OSC (Optical Supervisory Channel) signal which is supplementary signal light for transmitting a status monitoring signal and a control signal of an optical transmission system, determining the presence or absence of a failure on the basis of the two kinds of signals and, when determining that an abnormality is present, reducing the output of excitation light. By the reduction of the output of excitation light, detection of main signal interruption becomes possible, and the APR control is consequently performed.

CITATION LIST

Patent Document 1: Japanese Patent Application Laid-Open No. 2000-332695

Patent Document 2: Japanese Patent Application Laid-Open No. 2004-297790

Patent Document 3: Japanese Patent Application Laid-Open No. 2010-278493

Patent Document 4: Japanese Patent Application Laid-Open No. 2008-288849

Patent Document 5: Japanese Patent Application Laid-Open No. 2010-004410

SUMMARY OF INVENTION

Technical Problem

However, in the case of the technology of Patent Document 5, when a failure occurs in a means for monitoring the OSC signal, detection of main signal interruption becomes impossible. In such a case, the APR control is not performed.

In view of such a problem, the objective of the present invention is to provide an optical transmission device, an optical transmission system, an optical transmission method and a program which can perform the APR control with high accuracy, in an optical transmission device which employs Raman optical amplification and uses a light monitoring signal for monitoring a communication status, even when a communication interruption of a main signal occurs in the state where a means for monitoring the light monitoring signal is in failure.

Solution to Problem

In order to achieve the above-described objective, an optical transmission device according to the present invention comprises a Raman amplification means which generates excitation light, amplifies second main signal light by the use of the excitation light, and outputs the amplified second main signal light; a main signal light sending means which sends first main signal light; a communication interruption detection light monitoring means which monitors communication interruption detection light having a wavelength not influenced by the excitation light, and sends a first signal if it cannot detect the communication interruption detection light; a main signal light monitoring means which monitors the second main signal light and, sends a second signal if it cannot detect the second main signal light; a light monitoring signal analysis means which analyzes a light monitoring signal and sends a result of the analysis as a third signal in a predetermined period of time; and a control means which makes the Raman amplification means suspend the generation of the excitation light, if it cannot receive the third signal even after the elapse of the predetermined period of time in the state it has received the first signal and has not received the second signal, and stops sending of the first main signal light from the main signal light sending means when receiving the second signal further.

Further, in order to achieve the above-described objective, an optical transmission system according to the present invention comprises an above-described optical transmission device which receives the second main signal light via a first transmission line and sends the first main signal light via a second transmission line and another above-described optical transmission device which receives the first main signal light via the second transmission line and sends the second main signal light via the first transmission line.

Further, in order to achieve the above-described objective, an optical transmission method according to the present invention comprises: generating excitation light and Raman-amplifying the optical signal by the use of the excitation light;

sending first main signal light; monitoring communication interruption detection light having a wavelength not influenced by the excitation light and, sending a first signal if the communication interruption detection light cannot be detected; sending a second signal if second main signal light cannot be detected; analyzing a light monitoring signal and sending a result of the analysis as a third signal in a predetermined period of time; and, suspending the generation of the excitation light, if the third signal cannot be received even after the elapse of the predetermined period of time in the state the first signal has been received and the second signal has not been received, and stopping sending of the first main signal light, if the second signal is further received.

Further, in order to achieve the above-described objective, a program according to the present invention is a program which can be executed by a computer of an optical transmission device comprising a Raman amplifying means which generates excitation light and amplifies an optical signal by the use of the excitation light. This program causes the computer of the optical transmission device to execute: a process of sending first main signal light; a process of monitoring communication interruption detection light having a wavelength not influenced by the excitation light and, sending a first signal if the communication interruption detection light cannot be detected; a process of sending a second signal if second main signal light cannot be detected; a process of analyzing a light monitoring signal and sending a result of the analysis as a third signal in a predetermined period of time; and a process of suspending the generation of the excitation light, if the third signal cannot be received even after the elapse of the predetermined period of time in the state the first signal has been received and the second signal has not been received, and stopping sending of the first main signal light, if the second signal is further received.

Advantageous Effects of Invention

According to the present invention, in an optical transmission device which employs Raman optical amplification and uses a light monitoring signal for monitoring a communication status, the APR control can be performed with high accuracy even when a communication interruption of a main signal occurs in the state where a means for monitoring the light monitoring signal is in failure.

DESCRIPTION OF EMBODIMENTS

First Exemplary Embodiment

Figure 1:
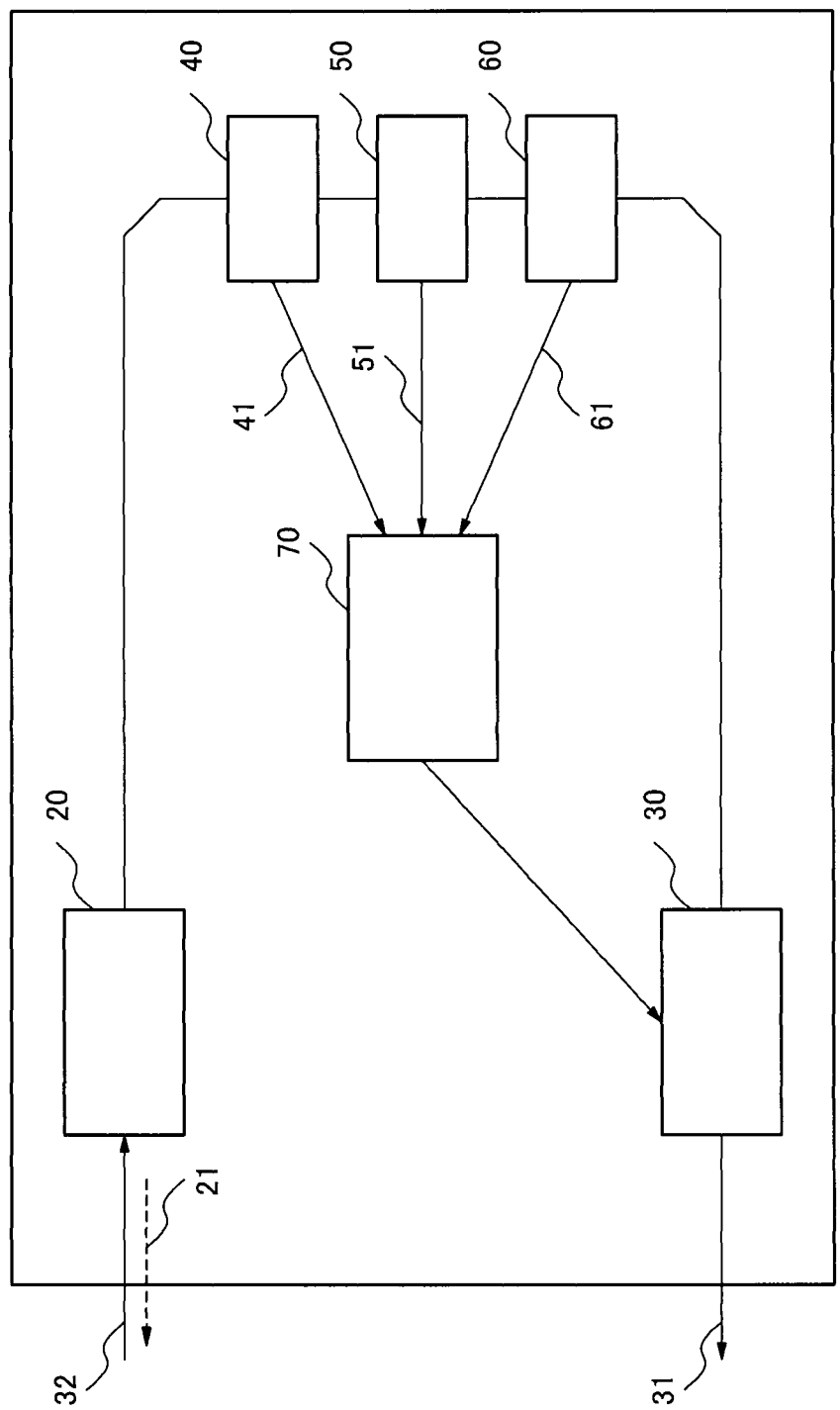
FIG. 1 is a block diagram of an optical transmission device 10 according to a first exemplary embodiment of the present invention.

FIG. 1 shows a block configuration diagram of an optical transmission device according to a first exemplary embodiment. In FIG. 1, the optical transmission device 10 according to the present exemplary embodiment comprises a Raman amplification means 20, a main signal light sending means 30, a communication interruption detection light monitoring means 40, a main signal light monitoring means 50, a light monitoring signal analysis means 60 and a control means 70.

The Raman amplification means 20 generates excitation light 21 and Raman-amplifies second main signal light 32 or the like inputted to the optical transmission device 10 by the use of the excitation light 21.

The main signal light sending means 30 sends first main signal light 31 with various types of information being carried on it to the outside.

The communication interruption detection light monitoring means 40 monitors communication interruption detection light inputted to the optical transmission device 10 and sends a first signal 41 to the control means 70 if the communication interruption detection light cannot be detected. Here, the communication interruption detection light has a wavelength not influenced by the excitation light 21.

The main signal light monitoring means 50 monitors the second main signal light 32 inputted to the optical transmission device 10 and sends a second signal 51 to the control means 70 if the second main signal light 32 cannot be detected.

The light monitoring signal analysis means 60 analyzes a light monitoring signal inputted to the optical transmission device 10 and sends a result of the analysis to the control means 70 as a third signal 61 in a predetermined period of time. Here, in the present exemplary embodiment, the light monitoring signal includes instruction information on whether or not to stop sending of the first main signal light 31.

The control means 70 suspends the generation of the excitation light 21 in the Raman amplification means 20, if it cannot receive the third signal 61 even after the elapse of a predetermined period of time in the state it has received the first signal 41 and has not received the second signal 51. The control means 70 stops sending of the first main signal light 31 from the main signal light sending means 30 when subsequently receiving the second signals 51 further.

In the optical transmission device 10 according to the present exemplary embodiment comprises the communication interruption detection light monitoring means 40 which monitors communication interruption detection light having a wavelength not influenced by the excitation light 21. If occurrence of abnormality is detected only by the communication interruption detection light monitoring means 40, the optical transmission device 10 suspends the generation of the excitation light 21 so as to increase the accuracy of abnormality detection by the main signal light monitoring means 50. After that, if occurrence of abnormality is detected by the main signal light monitoring means 50, the optical transmission device 10 stops sending of the first main signal light 31.

In this case, even when the main signal light sending means 30 cannot detect abnormality owing to the influence of the excitation light 21 and the light monitoring signal analysis means 60 does not function, it is still possible to detect abnormality with high accuracy and accordingly stop sending of the first main signal light 31.

Here, when the light monitoring signal analysis means 60 functions normally, it is possible that the light monitoring signal analysis means 60 analyzes the light monitoring signal and stops sending of the first main signal light 31 if it directs stop of the sending of the first main signal light 31. Alternatively, it is also possible that the light monitoring signal analysis means 60 sends the analysis result to the control means 70 and the control means 70 stops sending of the first main signal light 31, if the light monitoring signal directs stop of the sending of the first main signal light 31.

Further, if the light monitoring signal analysis means 60 cannot detect the light monitoring signal, it may send a fourth signal not illustrated in the diagram to the control means 70. In this case, the control means 70 stops sending of the first main signal light 31 when receiving at least two among the first signal 41, the second signal 51 and the fourth signal.

Second Exemplary Embodiment

Figure 2:
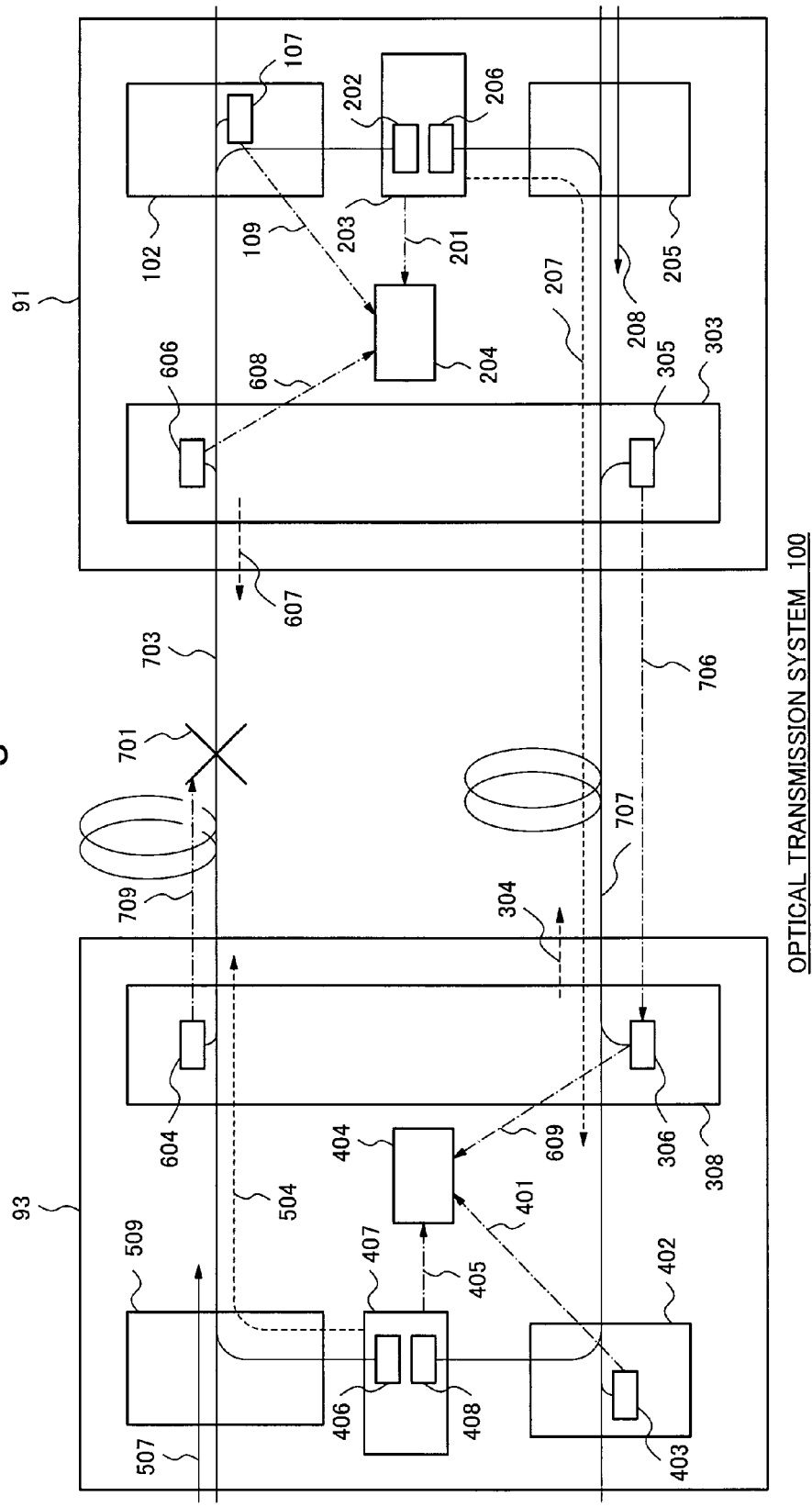
FIG. 2 is a system configuration diagram of an optical transmission system 100 according to a second exemplary embodiment of the present invention.

A second exemplary embodiment will be described below. FIG. 2 shows a system configuration diagram of an optical transmission system according to the second exemplary embodiment. In FIG. 2, an optical transmission system 100 according to the present exemplary embodiment comprises devices 91, 93 which send and receive an optical signal to and from each other via transmission lines 703, 707.

In FIG. 2, the device 91 comprises an optical amplification unit 102, a light monitoring signal control unit 203, a monitoring control unit 204, an optical amplification unit 205 and a Raman optical amplification unit 303. The device 91 sends to the device 93 a main signal 208, a light monitoring signal 207 and light for main signal interruption detection 706 via the transmission line 707.

On the other hand, the device 93 comprises an optical amplification unit 402, a light monitoring signal control unit 407, a monitoring control unit 404, an optical amplification unit 509 and a Raman optical amplification unit 308. The device 93 sends to the device 91 a main signal 507, a light monitoring signal 504 and light for main signal interruption detection 709 via the transmission line 703.

In the present exemplary embodiment, the optical amplification unit 102, the light monitoring signal control unit 203, the monitoring control unit 204, the optical amplification unit 205 and the Raman optical amplification unit 303, of the device 91, have the same functions as that of respectively the optical amplification unit 402, the light monitoring signal control unit 407, the monitoring control unit 404, the optical amplification unit 509 and the Raman optical amplification unit 308, of the device 93. Although the following description will be given of the functions of the device 91, the device 93 has the same ones.

The optical amplification unit 102 monitors the main signal 507 received from the device 93 at its main signal detection section 107. If the optical amplification unit 102 cannot detect the main signal 507, it sends a report signal 109 to the monitoring control unit 204.

The light monitoring signal control unit 203 processes, at its monitoring signal detection section 202, the light monitoring signal 504 which is multiplexed with the main signal 507 received from the device 93, and generates the light monitoring signal 207 and sends it to the optical amplification unit 205 at its light source for light monitoring signal 206.

The light monitoring signal control unit 203 analyzes the light monitoring signal 504 and sends, to the monitoring control unit 204 at predetermined time intervals, a report signal 201 for reporting on whether or not APR (Auto Power Reduction) information for stopping sending of the main signal 208 is added to the light monitoring signal 504. Here, if the APR information is added to the light monitoring signal 504, the light monitoring signal control unit 203 further adds APR information for stopping the sending of the main signal 507 to the generated light monitoring signal 207, and then sends the light monitoring signal 207, along with the instruction to stop sending of the main signal 208 (hereafter, referred to as a "main signal sending stop instruction"), to the optical amplification unit 205.

Furthermore, if the light monitoring signal 504 cannot be detected at the monitoring signal detection section 202, the light monitoring signal control unit 203 sends to the monitoring control unit 204 a report signal 201 indicating that the light monitoring signal 504 cannot be detected. Then, when receiving an APR processing instruction from the monitoring control unit 204, the light monitoring signal control unit 203 sends to the optical amplification unit 205 the light monitoring signal 207 with the APR information added to it and the main signal sending stop instruction.

When receiving the report signal 201 indicating that APR information is present from the light monitoring signal control unit 203, the monitoring control unit 204 sends the APR processing instruction to the Raman optical amplification unit 303.

Also when receiving a report signal 608 from the Raman optical amplification unit 303 and also the report signal 201 indicating that the light monitoring signal 504 cannot be detected from the light monitoring signal control unit 203, the monitoring control unit 204 sends the APR processing instruction to the Raman optical amplification unit 303 and the light monitoring signal control unit 203.

Also when receiving the report signal 608 from the Raman optical amplification unit 303 but not receiving the report signal 201 from the light monitoring signal control unit 203 even after the elapse of a predetermined period of time, the monitoring control unit 204 sends the APR processing instruction to the Raman optical amplification unit 303. When subsequently receiving further the report signal 109 from the optical amplification unit 102, the monitoring control unit 204 sends the main signal sending stop instruction to the optical amplification unit 205.

The optical amplification unit 205 multiplexes the light monitoring signal 207 received from the light monitoring signal control unit 203 with the main signal 208 to be sent to the device 93, and sends the multiplexed signal to the Raman optical amplification unit 303. When receiving the main signal sending stop instruction from the light monitoring signal control unit 203 or the monitoring control unit 204, the optical amplification unit 205 stops sending of the main signal 208.

The Raman optical amplification unit 303 amplifies an optical signal inputted to the device 91 using the excitation light 607 and sends the amplified signal to the optical amplification unit 102. The Raman optical amplification unit 303 also monitors, at its section for receiving light for main signal interruption detection 606, light for main signal interruption detection 709 which is multiplexed with the main signal 507 inputted from the device 93. Then, if the Raman optical amplification unit 303 cannot detect the light for main signal interruption detection 709, it sends the report signal 608 to the monitoring control unit 204.

The Raman optical amplification unit 303 according to the present exemplary embodiment also generates light for main signal interruption detection 706 at its light source for main signal interruption detection 305 using a wavelength not influenced by excitation light 304. The Raman optical amplification unit 303 multiplexes the light for main signal interruption detection 706 with the main signal 208 and the light monitoring signal 207, both received from the optical amplification unit 205, and sends the multiplexed signal to the device 93. Here, the Raman optical amplification unit 303 suspends the generation of the excitation light 607 and of the light for main signal interruption detection 706 when receiving the APR processing instruction from the monitoring control unit 204.

Next, a description will be given of APR control operation of the optical transmission system 100 according to the present exemplary embodiment which is configured as described above. First, using FIG. 3, a description will be given of APR control in a case an abnormality occurs at a position 701 on the transmission line 703 in the state the devices 91 and 93 are normally operating.

If an abnormality occurs at the position 701 on the transmission line 703, because the Raman optical amplification unit 303 of the device 91 cannot detect the light for main signal interruption detection 709, it sends the report signal 608 to the monitoring control unit 204. Because the light monitoring signal control unit 203 cannot detect the light monitoring signal 504, it sends the report signal 201 indicating that the light monitoring signal 504 cannot be detected to the monitoring control unit 204. Here, if the optical amplification unit 102 cannot detect the communication interruption of the main signal 507 owing to the influence of the excitation light 607, the report signal 109 is not sent to the monitoring control unit 204.

If the monitoring control unit 204 receives the report signal 608 from the Raman optical amplification unit 303 and does also the report signal 201 indicating that the light monitoring signal 504 cannot be detected from the light monitoring signal control unit 203 (S101), determining that an abnormality has occurred, it sends the APR processing instruction to the Raman optical amplification unit 303 and the light monitoring signal control unit 203 (S102).

When receiving the APR processing instruction from the monitoring control unit 204, the light monitoring signal control unit 203 adds APR information for interrupting the main signal 507 to the light monitoring signal 207 and sends the light monitoring signal 207 along with the main signal sending stop instruction to the optical amplification unit 205 (S103). Receiving the light monitoring signal 207 with the APR information added to it and the main signal sending stop instruction from the light monitoring signal control unit 203, the optical amplification unit 205 stops sending of the main signal 208 (S104) and sends only the light monitoring signal 207 with the APR information added to it to the Raman optical amplification unit 303.

On the other hand, when receiving the APR processing instruction from the monitoring control unit 204, the Raman optical amplification unit 303 suspends the generation of the excitation light 607 and of the light for main signal interruption detection 706. Also, the Raman optical amplification unit 303 sends the light monitoring signal 207 with the APR information added to it, which was received from the optical amplification unit 205, to the device 93, giving no change to the signal (S105).

In the device 93 having received the light monitoring signal 207 with the APR information added to it from the device 91, because the Raman optical amplification unit 308 cannot detect the light for main signal interruption detection 706, it sends a report signal 609 to the monitoring control unit 404. Because the APR information is added to the light monitoring signal 207 (S106), the light monitoring signal control unit 407 sends a report signal 405 indicating that the APR information is present to the monitoring control unit 404 and also sends the light monitoring signal 504 with the APR information added to it and the main signal sending stop instruction to the optical amplification unit 509 (S107). Here, if the optical amplification unit 402 cannot detect the communication interruption of the main signal 208 owing to the influence of the excitation light 304, a report signal 401 is not sent to the monitoring control unit 404.

The optical amplification unit 509 receiving the main signal sending stop instruction, so the sending of the main signal 507 is stopped (S108). Receiving the report signal 405 indicating that the APR information is present, the monitoring control unit 404 sends the APR processing instruction to the Raman optical amplification unit 308.

As has been described above, in the optical transmission system 100 according to the present exemplary embodiment, in case an abnormality occurs in the state the devices 91, 93 are normally operating, as a result of the light monitoring signal control units 203, 407 monitoring the light monitoring signals 504 and 207, respectively, the devices 91, 93 can perform APR control appropriately and can accordingly stop sending of the main signals 208, 507.

Figure 4:
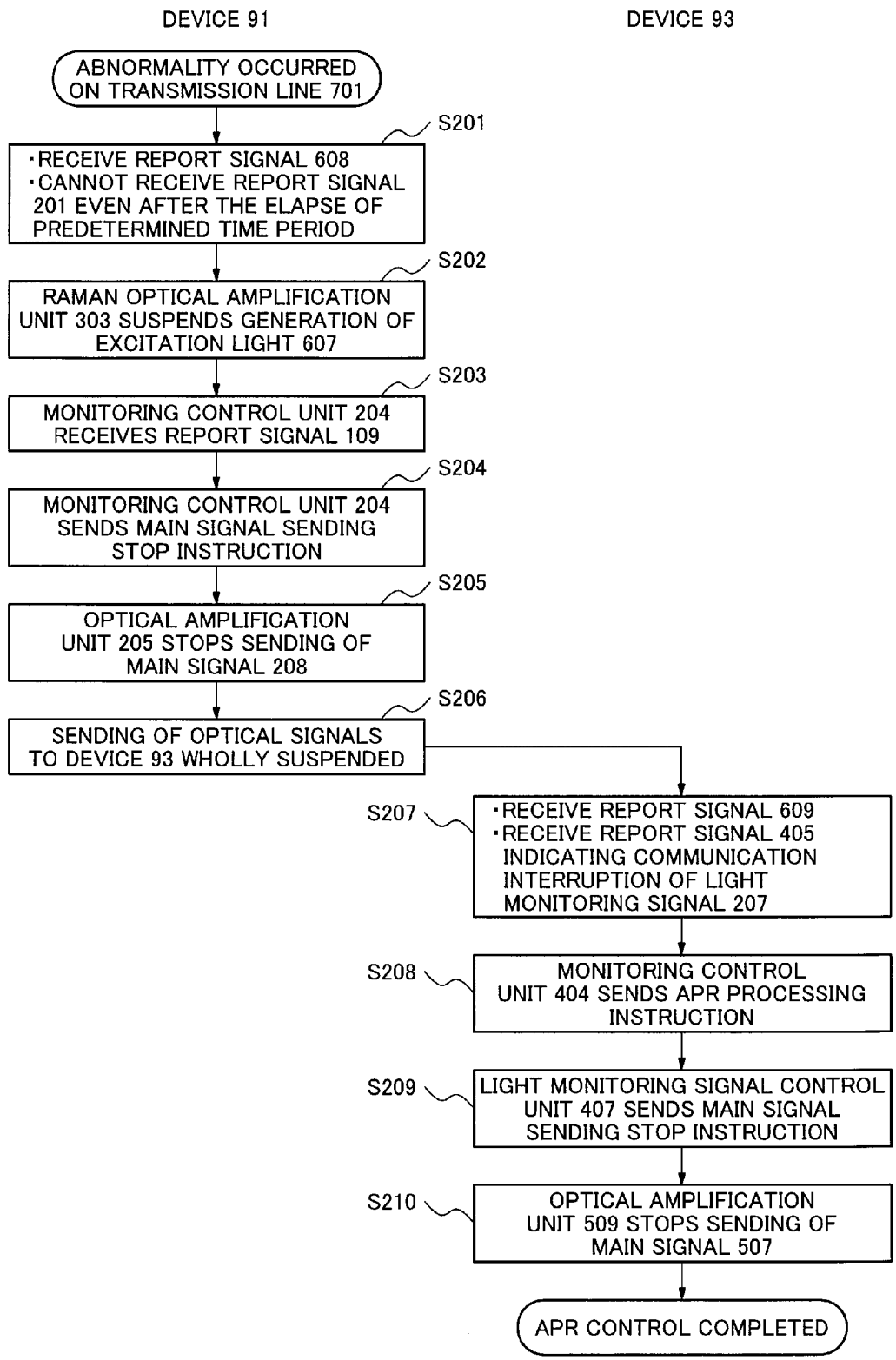
FIG. 4 is another flow chart of APR control in the optical transmission system 100 according to the second exemplary embodiment of the present invention.

Next, using FIG. 4, a description will be given of APR control in a case an abnormality occurs at the position 701 on the transmission line 703 in the state the light monitoring signal control unit 203 of the device 91 is in failure.

In this case, because the Raman optical amplification unit 303 of the device 91 cannot detect the light for main signal interruption detection 709, it sends the report signal 608 to the monitoring control unit 204. If the optical amplification unit 102 cannot detect the communication interruption of the main signal 507 owing to the influence of the excitation light 607, the report signal 109 is not sent to the monitoring control unit 204. Additionally, because the light monitoring signal control unit 203 is in failure, the report signal 201 and the light monitoring signal 207 are not sent.

If the monitoring control unit 204 has received the report signal 608 from the Raman optical amplification unit 303 but cannot receive the report signal 201 from the light monitoring signal control unit 203 even after the elapse of a predetermined period of time (S201), it sends the APR processing instruction to the Raman optical amplification unit 303. When receiving the APR processing instruction from the monitoring control unit 204, the Raman optical amplification unit 303 suspends the generation of the excitation light 607 and of the light for main signal interruption detection 706 (S202).

As a result of the interruption of the excitation light 607, the optical amplification unit 102 detects the communication interruption of the main signal 507 and accordingly sends the report signal 109 to the monitoring control unit 204 (S203). If the monitoring control unit 204 receives the report signal 608 from the Raman optical amplification unit 303 and the report signal 109 from the optical amplification unit 102, it determines that an abnormality has occurred in the state the light monitoring signal control unit 203 is in failure and sends the main signal sending stop instruction to the optical amplification unit 205 (S204).

When receiving the main signal sending stop instruction, the optical amplification unit 205 stops sending of the main signal 208 (S205). Here, because the light monitoring signal control unit 203 is in failure, the light monitoring signal 207 is not sent from the light monitoring signal control unit 203 to the optical amplification unit 205. Therefore, sending of optical signals from the optical amplification unit 205 to the Raman optical amplification unit 303 is wholly stopped.

On the other hand, also in the Raman optical amplification unit 303, the generation of the light for main signal interruption detection 706 has been suspended. Therefore, sending of optical signals from the device 91 to the device 93 is wholly suspended (S206).

In the device 93 for which sending of optical signals from the device 91 has been suspended, because the Raman optical amplification unit 308 cannot detect the light for main signal interruption detection 706, it sends the report signal 609 to the monitoring control unit 404. Because the light monitoring signal control unit 407 cannot detect the light monitoring signal 207, it sends the report signal 405 indicating the communication interruption of the light monitoring signal 207 to the monitoring control unit 404. Here, if the optical amplification unit 402 cannot detect the communication interruption of the main signal 208 owing to the influence of the excitation light 304, the report signal 401 is not sent to the monitoring control unit 404.

Receiving the report signal 609 from the Raman optical amplification unit 308 and the report signal 405 indicating that the light monitoring signal 207 cannot be detected from the light monitoring signal control unit 407 (S207), the monitoring control unit 404 determines that an abnormality has occurred and accordingly sends the APR processing instruction to the Raman optical amplification unit 308 and the light monitoring signal control unit 407 (S208).

When receiving the APR processing instruction, the Raman optical amplification unit 308 suspends the generation of the excitation light 304 and of the light for main signal interruption detection 709. When receiving the APR processing instruction, the light monitoring signal control unit 407 sends the light monitoring signal 504 with the APR information added to it and the main signal sending stop instruction to the optical amplification unit 509 (S209). The optical amplification unit 509 receiving the main signal sending stop instruction, so the sending of the main signal 507 is stopped (S210).

As has been described above, the Raman optical amplification unit 303 monitors the light for main signal interruption detection 709 which is generated using a wavelength not influenced by the excitation light 607. Then, if the monitoring control unit 204 has received the report signal 608 from the Raman optical amplification unit 303 but cannot receive the report signal 201 from the light monitoring signal control unit 203 even after the elapse of a predetermined period of time, it suspends the generation of the excitation light 607. When subsequently receiving further the report signals 109 from the optical amplification unit 102, the monitoring control unit 204 stops sending of the main signal 208. Accordingly, the device 93 also stops sending of the main signal 507. As a result, even when the light monitoring signal control unit 203 of the device 91 is in failure, the sending of the main signals 208, 507 is stopped, and APR control is thus performed appropriately.

Figure 5:
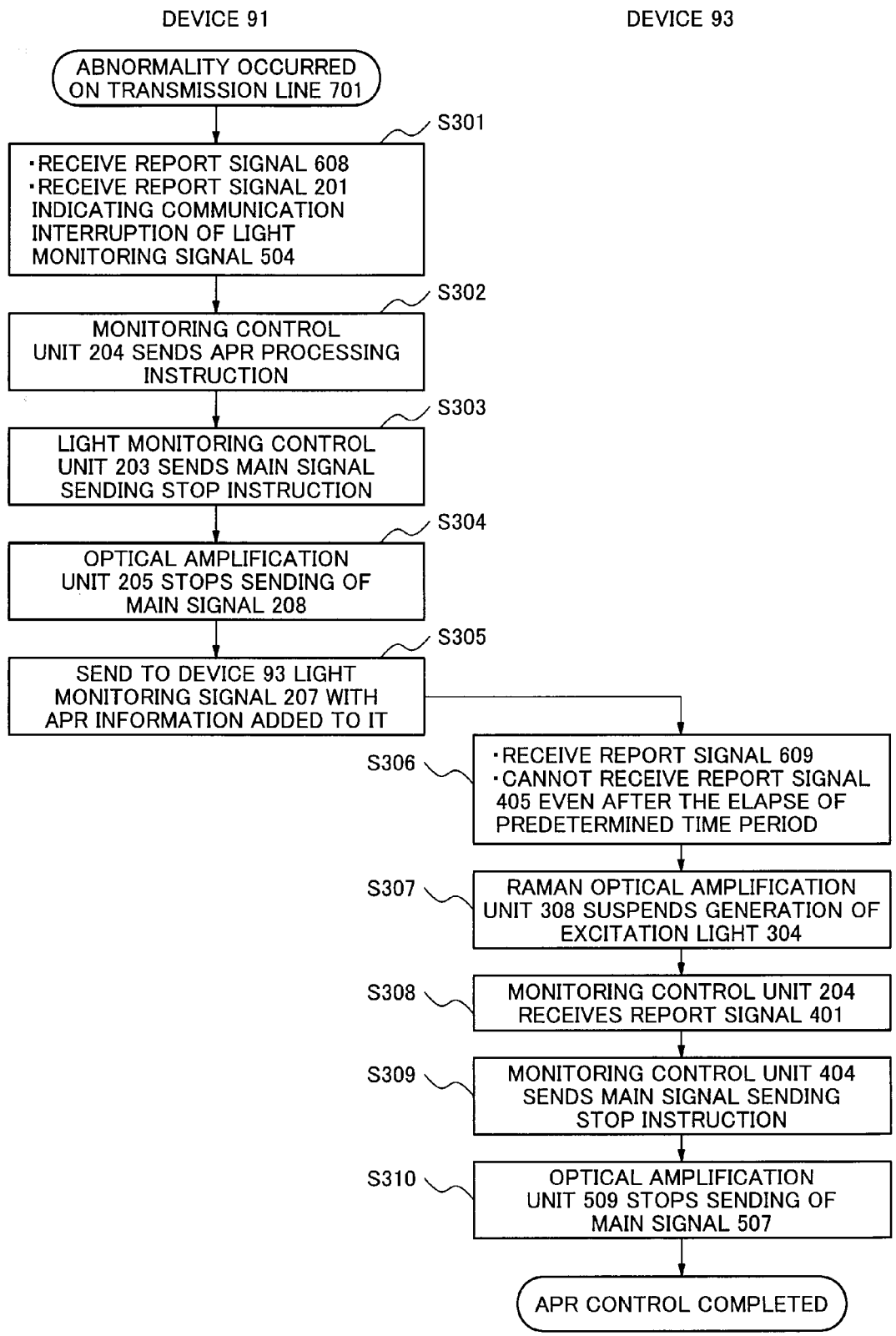
FIG. 5 is still another flow chart of APR control in the optical transmission system 100 according to the second exemplary embodiment of the present invention.

Next, using FIG. 5, a description will be given of APR control in a case an abnormality occurs at the position 701 on the transmission line 703 in the state the light monitoring signal control unit 407 of the device 93 is in failure.

Figure 3:
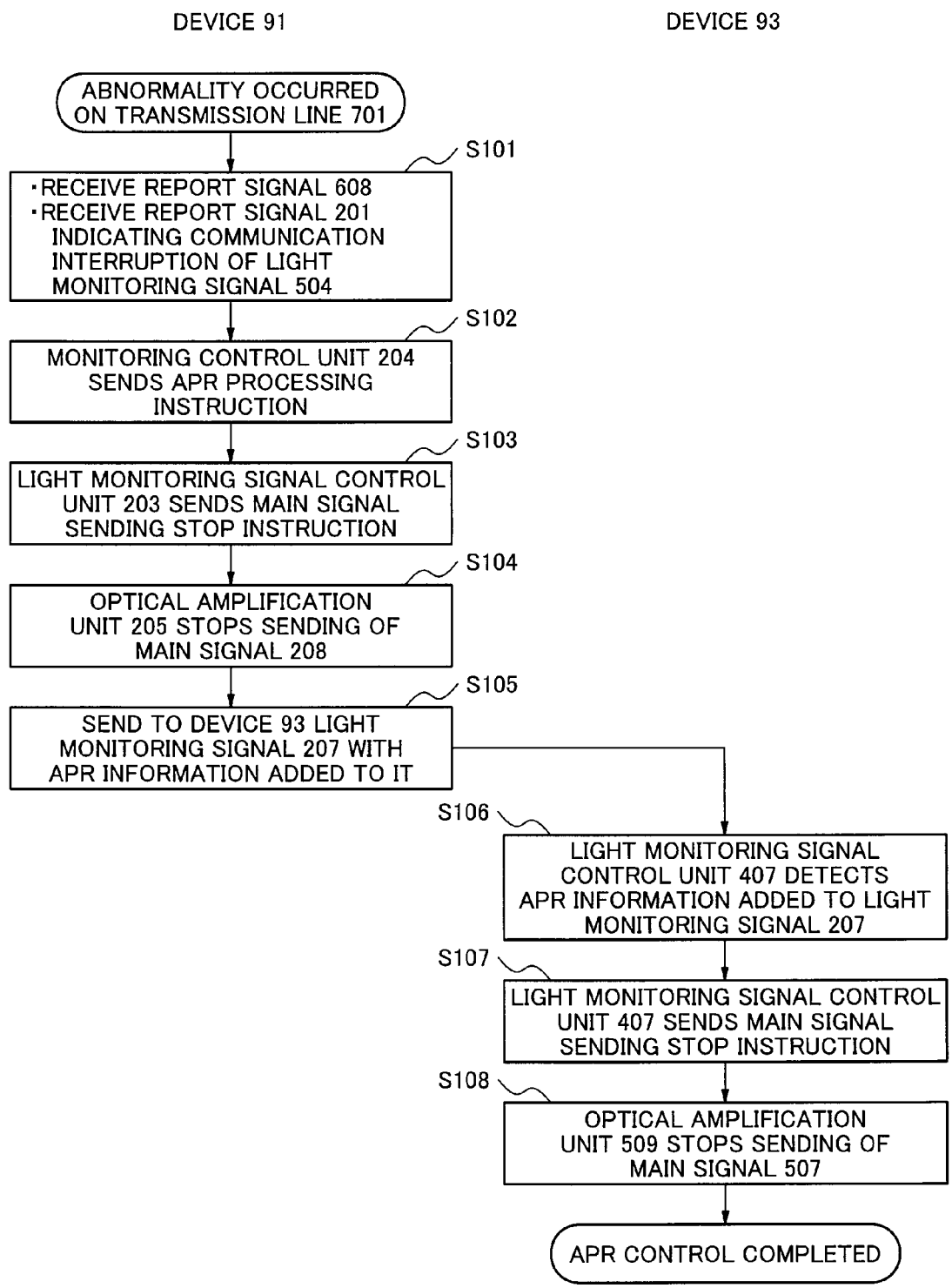
FIG. 3 is a flow chart of APR control in the optical transmission system 100 according to the second exemplary embodiment of the present invention.

Here, because the processes performed in the device 91 (steps S301 to S305 in FIG. 5) are the same as the processes in the steps S101 to S105 in FIG. 3, their detailed descriptions will be omitted. That is, if an abnormality occurs at the position 701 on the transmission line 703 in the state the light monitoring signal control unit 407 of the device 93 is in failure, the light monitoring signal 207 with the APR information added to it is sent from the device 91 to the device 93.

A description will be given below of operation of the device 93 having received the light monitoring signal 207 with the APR information added to it. Because the Raman optical amplification unit 308 cannot detect the light for main signal interruption detection 709, it sends the report signal 609 to the monitoring control unit 404. If the optical amplification unit 402 cannot detect the communication interruption of the main signal 208 owing to the influence of the excitation light 304, the report signal 401 is not sent to the monitoring control unit 404. Additionally, because the light monitoring signal control unit 407 is in failure, the report signal 405 and the light monitoring signal 504 are not sent.

If the monitoring control unit 404 has received the report signal 609 from the Raman optical amplification unit 308 but cannot receive the report signal 405 from the light monitoring signal control unit 407 even after the elapse of a predetermined period of time (S306), it sends the APR processing instruction to the Raman optical amplification unit 308.

When receiving the APR processing instruction, the Raman optical amplification unit 308 suspends the generation of the excitation light 304 and of the light for main signal interruption detection 709 (S307). As a result of the interruption of the excitation light 304, the optical amplification unit 402 detects the communication interruption of the main signal 208 and accordingly sends the report signal 401 to the monitoring control unit 404 (S308).

If the monitoring control unit 404 receives the report signal 609 from the Raman optical amplification unit 308 and the report signal 401 from the optical amplification unit 402, it determines that an abnormality has occurred in the state the light monitoring signal control unit 407 is in failure and sends the main signal sending stop instruction to the optical amplification unit 509 (S309). The optical amplification unit 509 receiving the main signal sending stop instruction, the sending of the main signal 507 is stopped (S310).

As has been described above, if an abnormality occurs on the transmission line 703 in the state the light monitoring signal control unit 407 of the device 93 is in failure, the light monitoring signal 207 with the APR information added to it is sent from the device 91 to the device 93. On the side of the device 93, if the monitoring control unit 404 has received the report signal 609 from the Raman optical amplification unit 308 but cannot receive the report signal 405 from the light monitoring signal control unit 407 even after the elapse of a predetermined period of time, it suspends the generation of the excitation light 304. When subsequently receiving further the report signal 401 from the optical amplification unit 402, the monitoring control unit 404 stops sending of the main signal 507. Accordingly, even when the light monitoring signal control unit 407 of the device 93 is in failure, the sending of the main signals 208, 507 is stopped and APR control is thus performed appropriately.

Modified Example of the Second Exemplary Embodiment

A modified example of the second exemplary embodiment will be described. In the second exemplary embodiment, the Raman optical amplification units 303, 308 monitor the light for main signal interruption detection 706, 709, the optical amplification units 102, 402 do the main signals 208, 507, and the light monitoring signal control units 203, 407 do the light monitoring signals 207, 504, respectively.

However, units for monitoring these three types of optical signals are not limited to the above-described ones. For example, all of the light for main signal interruption detection 706, 709 and the main signals 208, 507 may be monitored at the optical amplification units 102, 402. A system configuration diagram of an optical transmission system in that case is shown in FIG. 6.

Figure 6:
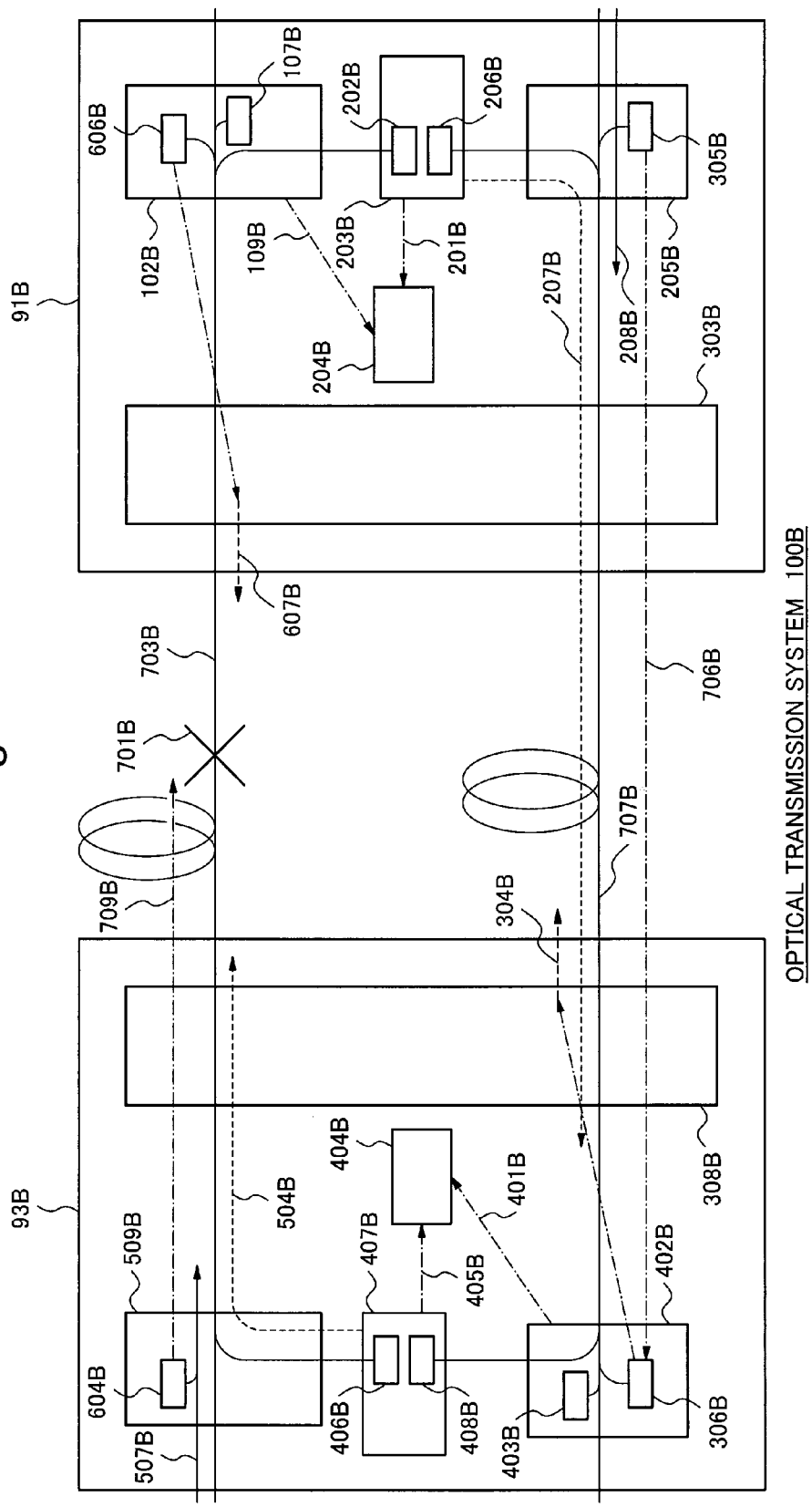
FIG. 6 is a system configuration diagram of an optical transmission system 100B according to a modified example of the second exemplary embodiment of the present invention.

In the optical transmission system 100B shown in FIG. 6, optical amplification units 102B, 402B comprise main signal detection sections 107B, 403B for monitoring main signals 507B, 208B, respectively, and also comprise sections for receiving light for main signal interruption detection 606B, 306B for monitoring light for main signal interruption detection 709B, 706B, respectively.

In the optical transmission system 100B according to the present exemplary embodiment, if the optical amplification units 102B, 402B cannot detect the light for main signal interruption detection 709B, 706B, respectively, they may suspend generation of excitation light 607B, 304B at Raman optical amplification units 303B, 308B.

Figure 7:
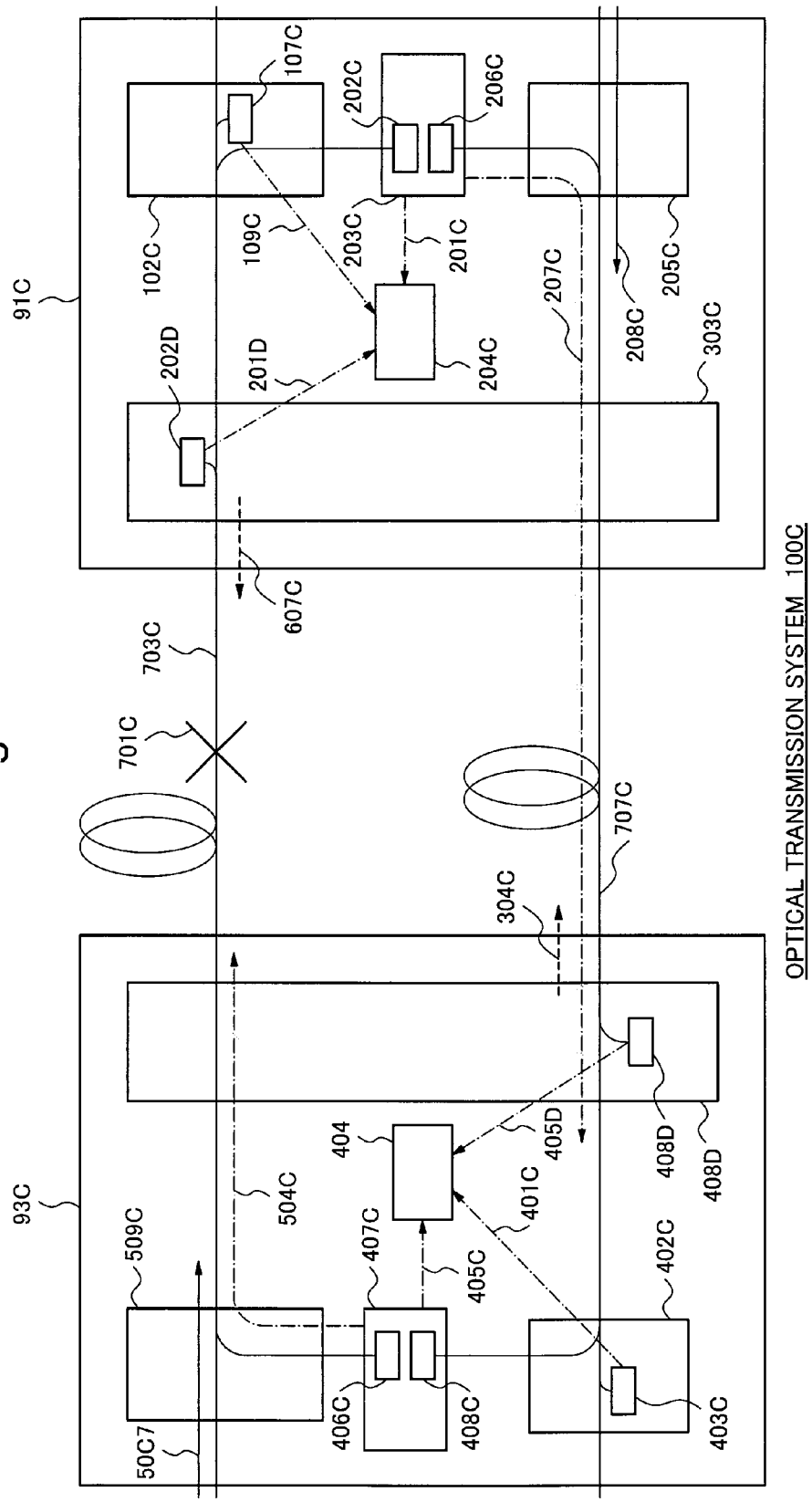
FIG. 7 is a system configuration diagram of an optical transmission system 100C according to another modified example of the second exemplary embodiment of the present invention.

Alternatively, the function of the light for main signal interruption detection 706, 709 may be included in that of the light monitoring signals 207, 504. An example of a system configuration diagram of an optical transmission system in that case is shown in FIG. 7. In the optical transmission system 100C shown in FIG. 7, light monitoring signal control units 203C, 407C generate, at light sources for light monitoring signal 206C, 406C, light monitoring signals 207C, 504C which have a wavelength not influenced by excitation light 304C, 607C and to which APR information for stopping sending of main signals 507C, 208C is to be added.

On the other hand, Raman optical amplification units 303C, 308C comprise monitoring signal detection sections 202D, 408D for analyzing light monitoring signals 207C, 504C respectively, in place of the sections for receiving light for main signal interruption detection 606, 306. The Raman optical amplification units 303C, 308C send, to monitoring control units 204C, 404C at predetermined intervals, report signals 201D, 405D for reporting on whether or not APR information is added, and send report signals 201D, 405D indicating that to the monitoring control units 204C, 404C if being unable to detect the light monitoring signals 207C, 504C.

A brief description will be given of APR control in the optical transmission system 100C shown in FIG. 7, in a case an abnormality occurs at a position 701C on a transmission line 703C in the state the light monitoring signal control unit 203C of a device 91C is in failure.

Because the Raman optical amplification unit 303C of the device 91C cannot detect the light monitoring signal 504C, it sends the report signal 201D to the monitoring control unit 204C. Because the light monitoring signal control unit 203C is in failure, a report signal 201C and the light monitoring signal 207C are not sent.

If the monitoring control unit 204C has received the report signal 201D from the Raman optical amplification unit 303C but cannot receive the report signal 201C from the light monitoring signal control unit 203C even after the elapse of a predetermined period of time, it suspends generation of the excitation light 607C in the Raman optical amplification unit 303C. As a result of the interruption of the excitation light 607C, the optical amplification unit 102C detects the communication interruption of a main signal 507C and accordingly sends a report signal 109C to the monitoring control unit 204C.

When receiving the report signal 109C further, the monitoring control unit 204C stops sending of a main signal 208C. Accordingly, sending of optical signals from the device 91C to a device 93C is wholly suspended. As a result of the stopping of sending of optical signals from the device 91C, APR control is performed also in the device 93C, and sending of the main signal 507C is thus stopped.

Next, a brief description will be given of APR control in a case where, in the optical transmission system 100C shown in FIG. 7, an abnormality occurs at the position 701C on the transmission line 703C in the state the light monitoring signal control unit 407C of the device 93C is in failure, in contrast to the above case.

In this case, because the Raman optical amplification unit 303C and the light monitoring signal control unit 203C of the device 91 cannot detect the light monitoring signal 504C, they send the report signals 405D, 405C respectively, to the monitoring control unit 204C. When receiving the report signals 405D, 405C, the monitoring control unit 204C sends the APR processing instruction to the Raman optical amplification unit 303C and the light monitoring signal control unit 203C. Accordingly, sending of the main signal 205C is stopped, and the light for main signal interruption detection 706C with the APR information added to it is sent to the device 93C.

In the device 93C, because the APR information is added to the light monitoring signal 207C received from the device 91C, the Raman optical amplification unit 308C sends the report signal 405D indicating that the APR information is present to the monitoring control unit 404C. Because the light monitoring signal control unit 407C is in failure, the report signal 405C indicating that the APR information is present or the like is not sent.

If the monitoring control unit 404C has received the report signal 405D indicating that the APR information is present from the Raman optical amplification unit 308C but cannot receive the report signal 405C from the light monitoring signal control unit 407C even after the elapse of a predetermined period of time, it suspends generation of the excitation light 304C in the Raman optical amplification unit 308C. When subsequently receiving further the report signal 401C from the optical amplification unit 402C, the monitoring control unit 404C stops sending of the main signal 507C.

Although the descriptions have been given above of the preferred exemplary embodiments of the present invention, they have been presented just as examples and in no way limit the present invention. To the present invention, various modifications can be made within the range not departing from the scope of the present invention. For example, the operation in each of the exemplary embodiments described above may be executed by hardware, software or a configuration of their combination. When executing the processes by software, a program in which the process sequences are recorded may be installed into a memory of a computer and then be executed. Further, part or whole of the exemplary embodiments described above may be described as the following supplementary notes, but is not limited to them.

(Supplementary note 1) An optical transmission device which, in performing transmission of an optical signal by the use of excitation light from a Raman optical amplification, performs sending and receiving of a main signal and light for main signal interruption detection with a wavelength not influenced by said excitation light, which are multiplexed with each other, to and from another optical transmission device, and, if being unable to detect the light for main signal interruption detection to be sent from said another optical transmission device, interrupts excitation light emitted by the own device, wherein the optical transmission device is characterized by that, when a failure has occurred in a light monitoring signal control means for controlling sending and receiving of a light monitoring signal multiplexed with said main signal, which is comprised in said another optical transmission device or the own device, if detecting an interruption of the main signal sent from said another optical transmission device, the optical transmission device performs control to suspend sending of the main signal to be sent to said another optical transmission device and also performs control to suspend sending of the light for main signal interruption detection to be sent to said another optical transmission device.

(supplementary note 2) The optical transmission device according to supplementary note 1 characterized by that the optical transmission device comprises, in addition to said light monitoring signal control means: a receiving-side optical amplification means which performs optical amplification on a main signal sent from said another optical transmission device; a sending-side optical amplification means which performs optical amplification on a main signal to be sent to said another optical transmission device; a Raman optical amplification means which sends out excitation light used for said Raman optical amplification; and a monitoring control means which performs control to suspend at least sending of the light for main signal interruption detection to be sent to said another optical transmission device, wherein:

said receiving-side optical amplification means comprises a main signal detection section which detects a main signal sent from said another optical transmission device; said Raman optical amplification means comprises a section for receiving light for main signal interruption detection which detects the light for main signal interruption detection sent from said another optical transmission device, and also comprises a light source section for light for main signal interruption detection which sends the light for main signal interruption detection to said another optical transmission device; and said light monitoring signal control means comprises a monitoring signal detection section which detects a light monitoring signal sent from said another optical transmission device.

(Supplementary note 3) The optical transmission device according to supplementary note 2 characterized by that, in case there occurs at least either of detection, by said main signal detection section, of an interruption of the main signal sent from said another optical transmission device and detection, by said section for receiving light for main signal interruption detection, of an interruption of the light for main signal interruption detection sent from said another optical transmission device, and there also occurs a failure in said light monitoring signal control means of the own device, said monitoring control means performs control to make said sending-side optical amplification means suspend sending of the main signal to be sent to said another optical transmission device and performs also control to make said light source section for light for main signal interruption detection suspend the light for main signal interruption detection to be sent to said another optical transmission device.

(Supplementary note 4) The optical transmission device according to supplementary note 2 characterized by that, in case there occurs at least either of detection, by said main signal detection section, of an interruption of the main signal sent from said another optical transmission device and detection, by said section for receiving light for main signal interruption detection, of an interruption of the light for main signal interruption detection sent from said another optical transmission device, and there also occurs detection of an interruption of the light monitoring signal sent from said another optical transmission device by said monitoring signal detection section of the own device's said light monitoring control means, said light monitoring signal control means of the own device performs control to make said sending-side optical amplification means suspend sending of the main signal to be sent to said another optical transmission device and also sends to said another optical transmission device a light monitoring signal including information for instructing said another optical transmission device to suspend sending of the main signal, and said monitoring control means performs control to make said light source section for light for main signal interruption detection suspend the light for main signal interruption detection to be sent to said another optical transmission device.

(Supplementary note 5) The optical transmission device according to any one of supplementary notes 2 to 4 characterized by that:

said section for receiving light for main signal interruption detection is comprised in said receiving-side optical amplification means instead of in said Raman amplification means; and said light source section for light for main signal interruption detection is comprised in said sending-side optical amplification means instead of in said Raman amplification means.

(Supplementary note 6) The optical transmission device according to any one of supplementary notes 2 to 5 characterized by that, when said light monitoring signal works also as said light for main signal interruption detection, said Raman amplification means does not comprise said light source section for main signal interruption detection nor said section for receiving light for main signal interruption detection, and said monitoring signal detection section comprised in said Raman amplification means functions as an alternative to said section for receiving light for main signal interruption detection, and said light monitoring signal control means functions as an alternative to said light source section for main signal interruption detection.

(Supplementary note 7) An optical transmission system characterized by that it comprises an optical transmission device according to any one of supplementary notes 1 to 6.

(Supplementary note 8) An optical transmission method which, in performing transmission of an optical signal by the use of Raman optical amplification by excitation light, performs sending and receiving of a main signal and light for main signal interruption detection with a wavelength not influenced by said excitation light, which are multiplexed with each other, to and from another optical transmission device, and, if being unable to detect the light for main signal interruption detection to be sent from said another optical transmission device, interrupts excitation light emitted by the own device, wherein the optical transmission method is characterized by that, when a failure has occurred in a light monitoring signal control means for controlling sending and receiving of a light monitoring signal multiplexed with said main signal, which is comprised in said another optical transmission device or the own device, if detecting an interruption of the main signal sent from said another optical transmission device, the optical transmission method performs control to suspend sending of the main signal to be sent to said another optical transmission device and performs also control to suspend sending of the light for main signal interruption detection to be sent to said another optical transmission device.

(Supplementary note 9) A program to be executed by a device which, in performing transmission of an optical signal by the use of Raman optical amplification by excitation light, performs sending and receiving of a main signal and light for main signal interruption detection with a wavelength not influenced by said excitation light, which are multiplexed with each other, to and from another optical transmission device, and, if being unable to detect the light for main signal interruption detection to be sent from said another optical transmission device, interrupts excitation light emitted by the own device, wherein the program is characterized by that, when a failure has occurred in a light monitoring signal control means for controlling sending and receiving of a light monitoring signal multiplexed with said main signal, which is comprised in said another optical transmission device or the own device, if detecting an interruption of the main signal sent from said another optical transmission device, the program causes the device to execute a control process to suspend sending of the main signal to be sent to said another optical transmission device and execute also a control process to suspend sending of the light for main signal interruption detection to be sent to said another optical transmission device.

The present application is based upon and claims the benefit of priority from Japanese Patent Application No. 2011-031003, filed on Feb. 16, 2011, the disclosure of which is incorporated herein in its entirety by reference.

INDUSTRIAL APPLICABILITY

The present invention can be applied generally to a system, device, method and program which perform bidirectional optical transmission by the use of an optical amplification means using the Raman effect.

REFERENCE SIGNS LIST 10 optical transmission device
20 Raman amplification means
30 main signal light sending means
40 communication interruption detection light monitoring means
50 main signal light monitoring means
60 light monitoring signal analysis means
70 control means
91, 93 optical transmission device
102, 402 optical amplification unit
203, 407 light monitoring signal control unit
204, 404 monitoring control unit
205, 509 optical amplification unit
303, 308 Raman optical amplification unit
703, 707 transmission line
208, 507 main signal
207, 504 light monitoring signal
706, 709 light for main signal interruption detection
304, 607 excitation light
107, 403 main signal detection section
202, 408 monitoring signal detection section
206, 406 light source for optical monitoring signal
305, 604 light source for main signal interruption detection
306, 606 section for receiving light for main signal interruption detection

The invention claimed is:

1. An optical transmission device comprising:
a Raman amplification unit which generates excitation light, amplifies second main signal light by the use of the excitation light, and outputs the amplified second main signal light;
a main signal light sending unit which sends first main signal light;
a communication interruption detection light monitoring unit which monitors communication interruption detection light having a wavelength not influenced by said excitation light, and sends a first signal if it cannot detect said communication interruption detection light;
a main signal light monitoring unit which monitors said second main signal light and, sends a second signal if it cannot detect said second main signal light;
a light monitoring signal analysis unit which analyzes a light monitoring signal and sends a result of said analysis as a third signal in a predetermined period of time; and
a control unit which makes said Raman amplification unit suspend the generation of said excitation light, if it cannot receive said third signal even after the elapse of said predetermined period of time in the state it has received said first signal and has not received said second signal, and stops sending of the first main signal light from said main signal light sending unit when receiving said second signal further.

2. The optical transmission device according to claim 1, wherein said light monitoring signal includes an instruction on whether or not to stop sending of said first main signal light, and,
wherein said control unit stops sending of the first main signal light from said main signal light sending unit, if said third signal directs stop of the sending of said first main signal light.

3. The optical transmission device according to claim 1, further comprising:
a light monitoring signal output unit which generates and outputs said light monitoring signal;
wherein said control unit makes said light monitoring signal output unit generate a light monitoring signal which directs stop of the sending of said second main signal light, when it stops sending of the first main signal light from said main signal light sending unit.

4. The optical transmission device according to claim 1, wherein said light monitoring signal includes an instruction on whether or not to stop sending of said first main signal light; and,
wherein said light monitoring signal analysis unit stops sending of the first main signal light from said main signal light sending unit, if said light monitoring signal includes an instruction to stop sending of said main signal light.

5. The optical transmission device according to claim 4, further comprising:
a light monitoring signal output unit which generates and outputs said light monitoring signal;
wherein said light monitoring signal analysis unit makes said light monitoring signal output unit generate a light monitoring signal which directs stop of the sending of said second main signal light, if said light monitoring signal directs stop of the sending of said first main signal light.

6. The optical transmission device according to claim 1, wherein said light monitoring signal analysis unit sends a fourth signal, if it cannot detect said light monitoring signal, and
wherein said control unit stops sending of the first main signal light from said main signal light sending unit, if it receives at least two of said second, third and fourth signals.

7. The optical transmission device according to claim 6, wherein said light monitoring signal has a wavelength not influenced by said excitation light; and
wherein said communication interruption detection light monitoring unit analyzes said light monitoring signal and sends a result of the analysis as said third signal, instead of monitoring said communication interruption detection light, and sends said fourth signal, if it cannot detect said light monitoring signal.

8. An optical transmission system comprising:
an optical transmission device according to claim 1 which receives said second main signal light via a first transmission line and sends said first main signal light via a second transmission line; and
an optical transmission device according to claim 1 which receives said first main signal light via said second transmission line and sends said second main signal light via said first transmission line.

9. An optical transmission method comprising:
generating excitation light and Raman-amplifying optical signal by the use of said excitation light;
sending first main signal light;
monitoring communication interruption detection light having a wavelength not influenced by said excitation light and, sending a first signal if said communication interruption detection light cannot be detected;
sending a second signal, if second main signal light cannot be detected;
analyzing a light monitoring signal and sending a result of the analysis as a third signal in a predetermined period of time; and,
suspending the generation of said excitation light, if said third signal cannot be received even after the elapse of said predetermined period of time in the state said first signal has been received and said second signal has not been received, and stopping sending of the first main signal light, if said second signal is further received.

10. An optical transmission device comprising:
a Raman amplification means which generates excitation light, amplifies second main signal light by the use of the excitation light, and outputs the amplified second main signal light;
a main signal light sending means which sends first main signal light;
a communication interruption detection light monitoring means which monitors communication interruption detection light having a wavelength not influenced by said excitation light, and sends a first signal if it cannot detect said communication interruption detection light;
a main signal light monitoring means which monitors said second main signal light and, sends a second signal if it cannot detect said second main signal light;
a light monitoring signal analysis means which analyzes a light monitoring signal and sends a result of said analysis as a third signal in a predetermined period of time; and
a control means which makes said Raman amplification means suspend the generation of said excitation light, if it cannot receive said third signal even after the elapse of said predetermined period of time in the state it has received said first signal and has not received said second signal, and stops sending of the first main signal light from said main signal light sending means when receiving said second signal further.

* * * * *